United States Patent
Morel et al.

(10) Patent No.: US 7,197,209 B2
(45) Date of Patent: Mar. 27, 2007

(54) OPTICAL DISTRIBUTION SYSTEM FOR SENSORS

(75) Inventors: Yannick Morel, Arlington, VA (US); Oved Zucker, Arlington, VA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 10/891,191

(22) Filed: Jul. 15, 2004

(65) Prior Publication Data

US 2006/0013527 A1    Jan. 19, 2006

(51) Int. Cl.
    G02B 6/34    (2006.01)
    G02B 6/28    (2006.01)
    G02B 6/00    (2006.01)

(52) U.S. Cl. ............................. 385/37; 385/12; 385/24
(58) Field of Classification Search .................. 385/37; 398/48; 359/566
    See application file for complete search history.

(56) References Cited

U.S. PATENT DOCUMENTS

| | | | |
|---|---|---|---|
| 5,255,332 A | 10/1993 | Welch et al. | |
| 5,271,024 A | 12/1993 | Huber | |
| 5,511,083 A * | 4/1996 | D'Amato et al. | 372/6 |
| 5,848,204 A | 12/1998 | Wanser | |
| 5,982,962 A | 11/1999 | Koops et al. | |
| 6,069,985 A | 5/2000 | Albin et al. | |
| 6,087,655 A | 7/2000 | Kobrin | |
| 2003/0142977 A1* | 7/2003 | Murgatroyd et al. | 398/25 |
| 2005/0185885 A1* | 8/2005 | Onaka et al. | 385/24 |

OTHER PUBLICATIONS

PCT International Search Report dated Mar. 7, 2006 of International Application No. PCT/US05/24118 filed Jul. 7, 2005.

* cited by examiner

*Primary Examiner*—Michelle Connelly-Cushwa
(74) *Attorney, Agent, or Firm*—Robert C. Bertin; Bingham McCutchen LLP

(57) ABSTRACT

A single fiber optic cable is configured as a multiplexer/demultiplexer that allows wavelengths to exit the fiber along its length and feed an optical sensor network in a cost efficient and space efficient manner. The fiber may be implemented as a multimode optical fiber that includes a plurality of Fiber Bragg Gratings that are tilted relative to the axis of the multimode fiber. Each grating is used to reflect multiple wavelengths of light out of the fiber depending on the diameter and the number of principal modes of the fiber. The plurality of FBGs allows light at multiple wavelengths to be extracted from the fiber at multiple locations along its length. At each location, reflected light at multiple wavelengths extracted from the multimode fiber may be fed through a plurality of fiber optic paths to optical sensors banks of optical sensors.

28 Claims, 6 Drawing Sheets

OPTICAL DISTRIBUTION SYSTEM FOR SENSORS

FIELD OF THE INVENTION

The present invention relates to the distribution of light through fiber optics and, more particularly, to a system for distributing light over multimode fiber optic lines and multiplexing and demultiplexing the signals to read sensors for remote control and monitoring applications, including one to many signal distribution scenarios.

BACKGROUND OF THE INVENTION

Fiber optics have been used increasingly to carry information in single mode and multimode fibers because of their tremendous capacity to carry information and relative immunity to electromagnetic and other types of interference. In complex systems, requiring many interconnected paths in close proximity, fiber optic systems have been under utilized in part because of the difficulty in aligning fibers and perceived difficulties in distributing light in point to multi-point applications.

In single mode fibers, fiber bragg gratings have been used to extract multiple wavelengths of light through a lens for the purpose of creating a multiplexer using gratings at multiple locations along an optical fiber. This works well when it is acceptable to extract light at a single wavelength using a single grating at each location along an optical fiber. However, there may be other applications where it is desirable to extract light at multiple wavelengths at multiple locations along an optical fiber. In multimode fibers, vertical fiber bragg gratings have been used to implement sensors for measuring bending of the multimode fiber itself along the length of the multimode fiber.

There is a need for a technique that may be used to distribute multiple wavelengths of light from a grating at each of multiple locations along an optical fiber to distribute light efficiently and in a cost effective manner to sensors. There is a further need to distribute symmetric sets of wavelengths of light from multiple positions along an optical fiber to matched sets of optical sensors in a highly parallel and economical manner.

SUMMARY OF THE INVENTION

According to the present invention, a single fiber optic cable is configured as a multiplexer that allows wavelengths to exit the fiber along its length and feed an optical sensor network in a cost efficient and space efficient manner. The fiber may be implemented as a multimode optical fiber that includes a plurality of Fiber Bragg Gratings that are tilted relative to the axis of the multimode fiber. Each grating reflects light at multiple wavelengths out of the multimode fiber depending on the diameter, the number of principal modes, and the numerical aperture of the fiber. This allows light to be extracted from the fiber at multiple locations along its length and multiple wavelengths to be extracted at each location. Reflected light at multiple wavelengths extracted from the multimode fiber may be fed through a plurality of fiber optic paths to optical sensors.

For efficiency, the same wavelengths may be extracted at each Fiber Bragg Grating along the multimode optical fiber to allow distribution of symmetric sets of wavelengths of light to symmetric banks of optical sensors. In this manner, light may be efficiently distributed from a source, such as a broad band light source, to multiple networks or banks of sensors for remote monitoring or control applications. This contributes to economies of scale in design and implementation of optical sensor networks.

As an example, when the multimode optical fiber has twenty principal modes and ten identical Fiber Bragg Gratings, a single light source at one end of the fiber would allow the distribution of twenty channels (each channel comprising one wavelength of light) at ten locations along the fiber. To facilitate the extraction of light at each of the ten locations, it is desirable to equalize the mode power distribution between each identical Fiber Bragg Grating, such that approximately $1/20^{th}$ of the incident light energy at each Fiber Bragg Grating will be reflected out of the multimode optical fiber for distribution to sensors and the remaining power will continue along the multimode fiber optical cable to subsequent Fiber Bragg Gratings.

According to one embodiment of the present invention, an apparatus distributes light along multimode fibers to an optical sensor network and includes a multimode fiber, a plurality of Fiber Bragg Gratings and an optical sensor network. The multimode fiber optical cable carries light from a light source. The fiber includes a plurality of Fiber Bragg Gratings along its length that are offset from the fiber axis by a predetermined angle to reflect light so that the reflected light is not guided by the fiber. The reflected light is in turn distributed from each of the fiber bragg gratings to a plurality of optical sensors. The light source may be narrow band or broad band. The light reflected by each Fiber Bragg Grating includes light at a particular wavelength for each mode of the multimode fiber. The reflected light at each wavelength also leaves the multimode fiber through the fiber optic cladding at a different angle.

According to another embodiment of the present invention, the apparatus may further include a plurality of fibers positioned to convey the reflected light from the Fiber Bragg Gratings to the plurality of optical sensors. Each of the plurality of fibers may be positioned to convey reflected light corresponding to one particular wavelength to at least one of the optical sensors. The apparatus may further include optics, such as a lens or a lens array, positioned to convey the reflected light from each Fiber Bragg Grating to optical sensors or corresponding optics, such as fiber optics, that lead to the optical sensors.

According to another embodiment of the invention, the optical sensors may comprise a bank of optical sensors corresponding to each Fiber Bragg Grating and each sensor in each bank may corresponds to a particular wavelength of reflected light from the corresponding Fiber Bragg Grating. Each Fiber Bragg Grating may interact with a step index or graded index multimode fiber and may reflect the same or different wavelengths than other Fiber Bragg Gratings. Some Fiber Bragg Gratings may produce wavelengths that overlap in range with respect to other gratings and/or other Fiber Bragg Gratings may produce wavelengths that do not overlap at all in range with the wavelengths produced by other gratings. Any and all combinations of gratings may be implemented according to the present invention. The apparatus may further include a plurality of return optical fibers that convey the reflected light from the plurality of optical sensors to a signal processor.

BRIEF DESCRIPTION OF THE FIGURES

The present invention will be more fully appreciated with reference to the appended drawing figures and detailed description, in which.

DETAILED DESCRIPTION

According to the present invention, a single fiber optic cable is configured as a multiplexer that allows wavelengths to exit the fiber along its length and feed an optical sensor network in a cost efficient and space efficient manner. The fiber may be implemented as a multimode optical fiber that includes a plurality of Fiber Bragg Gratings that are tilted relative to the axis of the multimode fiber. The gratings are used to reflect light at multiple wavelengths out of fiber along its length. This allows light at a multiple wavelengths to be extracted from the fiber at multiple locations along its length, depending on the diameter of the fiber and the number of principal modes of the fiber. Reflected light at multiple wavelengths extracted from the multimode fiber may be fed through a plurality of fiber optic paths to optical sensors.

Figure 1:
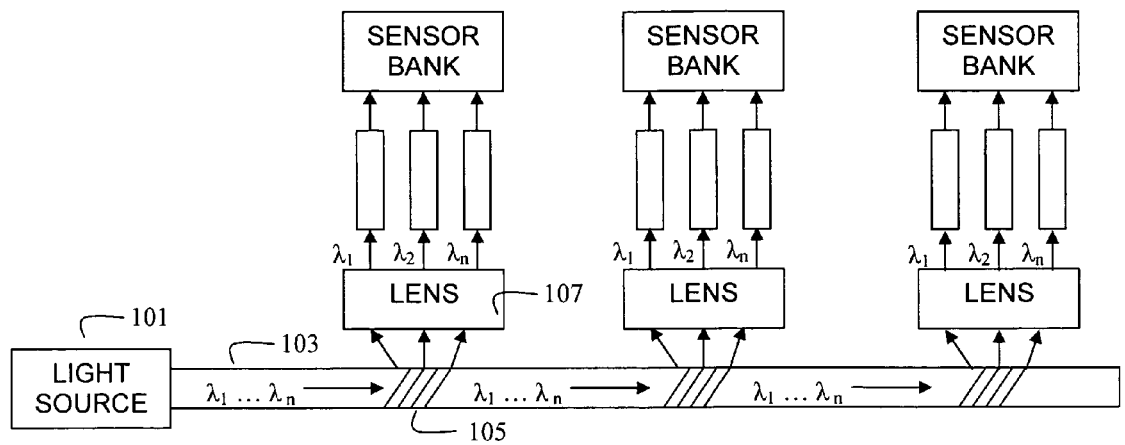
FIG. 1 depicts an optical network for distributing light over a multimode fiber to a plurality of sensors using fiber bragg gratings according to an embodiment of the present invention.

FIG. 1 depicts an optical network for distributing light over a multimode fiber to a plurality of sensors using Fiber Bragg Gratings according to an embodiment of the present invention. Referring to FIG. 1, the optical network includes a light source 101, a multimode optical fiber 103 having internal Fiber Bragg Gratings 105, optics, such as a lens or lens array 107, a plurality of fibers 109 and optical sensors 111.

The light source 101 may be any type of light source, narrow band or broad band. According to one embodiment of the invention, the light source is a broad band light source that emits light over a range of frequencies that includes several frequencies and wavelengths of interest for particular optical sensing applications. The light source 101 may be continuous or may be switched and used to interrogate optical sensors in the optical sensor network. As an illustrative example, the light source 101 may comprises a light emitting diode (LED) with a spectral bandwidth of, for example, 50 nm. Other examples include laser diodes and superluminescent LED's. However, it will be understood that any light source with any appropriate bandwidth may be implemented depending on the application.

The light source 101 is connected to the multimode optical fiber 103. The multimode optical fiber 103 conveys light from the light source along its length from one end to the other and is used to distribute light to the optical sensor network. At several predetermined points along the length of the fiber 103, it may be desirable to redirect at least a portion of the light propagating along the fiber 103 to one or more sensors 111 that are part of a sensor network.

According to one embodiment of the invention, light propagating along the length of the fiber 103 is reflected out of the fiber 103 at each desired location by one or more FBG's 105. Not all of the light is reflected out of the fiber 103, however. Rather, as described in more detail below, at each FBG particular wavelengths of light are reflected out of the fiber at different angles. Predominantly, the number of wavelengths reflected by the grating out of the fiber corresponds to the number of principal modes of the fiber. Each of these wavelengths represents a discrete channel that may be optically directed to an optical sensor according to an embodiment of the present invention. These wavelengths are generally those where light in each forward mode is reflected to the same backward mode. However, some additional wavelengths corresponding to reflection from a forward mode into a neighboring backward mode may also be reflected out of the fiber and may be used to interact with sensors according to an embodiment of the present invention. In general, each wavelength reflected out of the fiber represents a channel that may be optically directed to an optical sensor according to an embodiment of the present invention. The FBG may be formed in the optical fiber 103 in any well known manner.

In general, as explained in more detail below, the FBG is tilted relative to the axis of the fiber. This and the periodicity of the FBG causes incident light at preferred wavelengths and propagation modes to reflect off of the FBG at angles sufficient to cause the reflected light to exit the fiber through its cladding. The reflected light for each wavelength or channel leaves the fiber at a different angle, which facilitates coupling light at each distinct wavelength into a distinct fiber to convey each wavelength or channel to one or more distinct optical sensors. In this manner, the choice of multimode fiber, grating and light source are used to implement an optical network in which light at particular wavelengths travels along the length of a multimode fiber and exits at a defined number of particular wavelengths at predetermined locations to feed a sensor network. One advantage of a tilted FBG is that it has the ability to tap the reflected light out of the fiber 103 core. Preferably, the angle of the grating with respect to the fiber 103 axis may be between about 3 and about 85 degrees. More preferably, the angle of the grating with respect to the fiber 103 axis may be between about 3 and about 45 degrees, and most preferably the angle of the grating with respect to the fiber 103 axis may be between about 3 and 15 degrees. However, any convenient angle may be chosen according to the particular implementation and alignment considerations. In addition, certain angles and particularly those above 20 degrees induce polarization to the reflected light which may be conveyed to optical sensors or other locations to achieve a desired result. Moreover, the higher grating angles may produce weaker gratings and thus the angle of the grating may be used to adjust the strength of each grating and thus the properties of the reflected light resulting from the interaction of each mode with the grating. Thus, for example, the angle of the grating may be exploited to cause some modes to be reflected more strongly than others or to cause all modes to be reflected more strongly or more weakly than with a different grating angle.

Each grating itself may be written into the fiber in any form. Illustratively, the grating may be written with a step profile, with an impulses or sharp and narrow profile or with a beveled profile. Any other profile may be used. In the case of a beveled profile, the grating index changes gradually and thus the grating may interact with different modes to create reflected light having continuous ranges of wavelengths for each interacting mode. It may be desirable in some applications to convey such ranges or bands of light to each sensor according to an embodiment of the present invention.

Once the reflected light at multiple wavelengths exits the optical fiber 103, it may be channeled into individual optical fibers 109. The individual optical fibers may be aligned relative to the multimode fiber 103 so that each wavelength enters the end of a particular one of the fibers 109. In turn, the reflected light may be conveyed over the fiber 109 to a particular sensor 111 or a particular sensor within a sensor bank. Conveying light in this manner to an optical sensor allows one to stimulate and thereafter read an optical sensor or a network of optical sensors.

According to one embodiment of the invention, a lens 107 may be included between the multimode optical fiber 103 and the optical fibers 109 to facilitate directing the reflected light at different wavelengths from the FBG 105 to individual fibers 109 corresponding to each wavelength of reflected light. The alignment between the fiber 103, FBG's 105, fibers 109 and any intermediate lens 107 depends upon the angle of the FBG, the fiber parameters including its diameter and the number of principal modes and the separation between the fibers 109 and 103 and lens properties. However, the alignment is accomplished in a well known manner to ensure that light at each reflected wavelength is efficiently coupled into the corresponding fiber 109.

Figure 6:
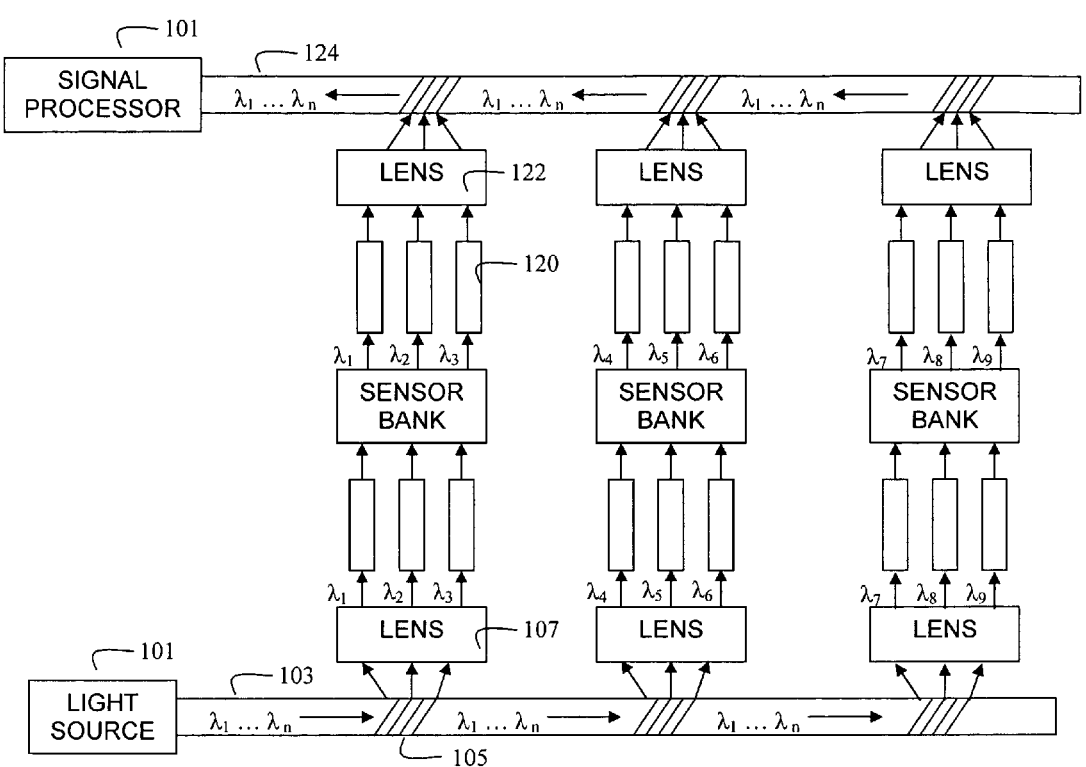
FIG. 6 depicts an optical network for distributing light over a multimode fiber to a plurality of sensors using different fiber bragg gratings which reflect different wavelengths at each location to respective sensors and a return path according to an embodiment of the present invention.

The FBG's themselves reflect one wavelength of light for each mode. Accordingly, only a portion of the power of the signal is redirected at any given FBG. Thus, for a twenty mode fiber, twenty wavelengths are reflected out of the fiber and for any particular wavelength reflected out, $1/20^{th}$ of the light power is reflected out at each FBG allowing the remaining light at the same wavelength to be further conveyed along the length of the fiber 103 from the light source 101. Depending on the optical network desired, the strength of each FBG may be adjusted to vary the amount of signal energy at each wavelength removed from the optical fiber. In addition, the periodicity of the FBG may be made the same for all FBG's or different, depending on whether the same wavelengths or different wavelengths are to be removed at each location. FIG. 6 depicts an example of different FBG's at each location which causes different wavelengths to be removed at each location.

When the same wavelengths are to be reflected at each FBG, it may be desirable to implement a mode scrambler between FBG's. This helps to ensure that the remaining power for a particular wavelength reflected out of the FBG is evenly distributed among all fiber modes downstream of each FBG from the light source. When the periodicity of the FBG is different so that different wavelengths are reflected at each FBG, there is no benefit to implementing a mode scrambler.

As shown in FIG. 1, the multimode fiber may be configured with many FBG's to facilitate feeding a network of multiple optical sensors or sensor banks with a single multimode optical fiber. The sensors themselves may be symmetrical between sensor banks. Alternatively, the sensors may each be unique. Any combination of unique and repetitive sensors may be implemented according to the present invention. When the same FBG is used in each location, substantially the same individual channels may be extracted at each location along the fiber which allows symmetrical sensor banks to be implemented.

Figure 2:
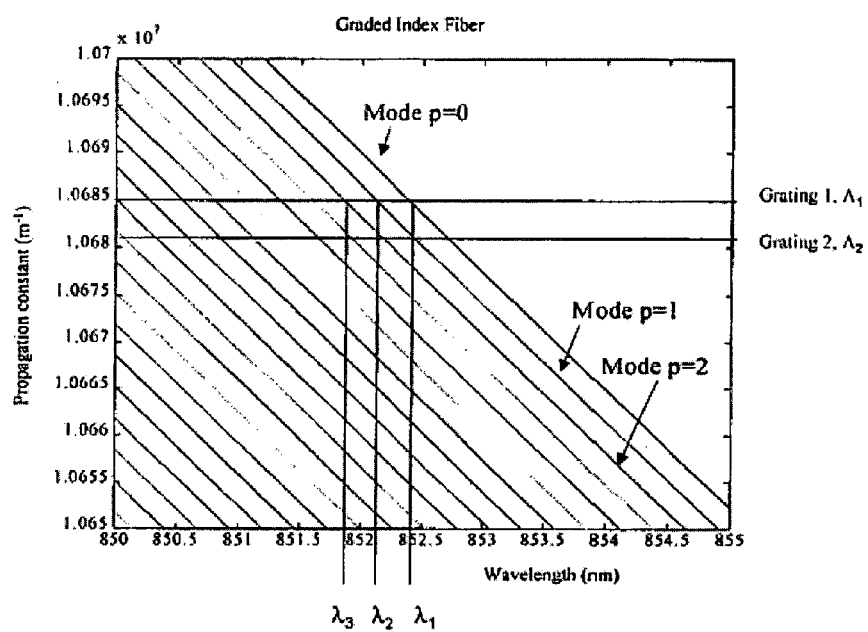
FIG. 2 depicts the interaction between two fiber bragg gratings and light at various wavelengths in a multimode fiber according to an embodiment of the present invention.

FIG. 2 depicts the interaction between two Fiber Bragg Gratings and light at various wavelengths in a multimode fiber according to an embodiment of the present invention. Referring to FIG. 2, a FBG presents multiple reflection peaks due to the presence of different modes for which the Bragg condition is satisfied. Referring to FIG. 2, it is apparent that grating 1 produces reflected light at wavelengths $\lambda_1$ $\lambda_2$ $\lambda_3$. As shown, $\lambda_1$ is reflected based on the interaction between the grating and propagation mode 0. $\lambda_2$ is reflected based on the interaction between the grating and propagation mode 1. $\lambda_3$ is reflected based on the interaction between the grating and propagation mode 2. As explained below, the grating order is limited to one and the number of reflected wavelengths is a function of the number of modes propagating in the fiber, and hence, they are controlled by the diameter and the numerical aperture of the fiber. Thus, the number of channels extracted by the FBG and the separation between the channels may be adjusted by changing the fiber parameters. A graded index fiber, for example, will tend to reflect wavelengths with a more uniform spacing. A step index fiber may include more principal modes and may produce less uniform spacing between wavelengths. The FBG is preferably written into the fibers of the fiber optic cable, allowing multiple wavelengths to be to be directed outward from the fiber optic cable. Preferably, the interacting wavelengths that are directed away from the fiber optic cable have a desired degree of spatial separation.

Figure 3:
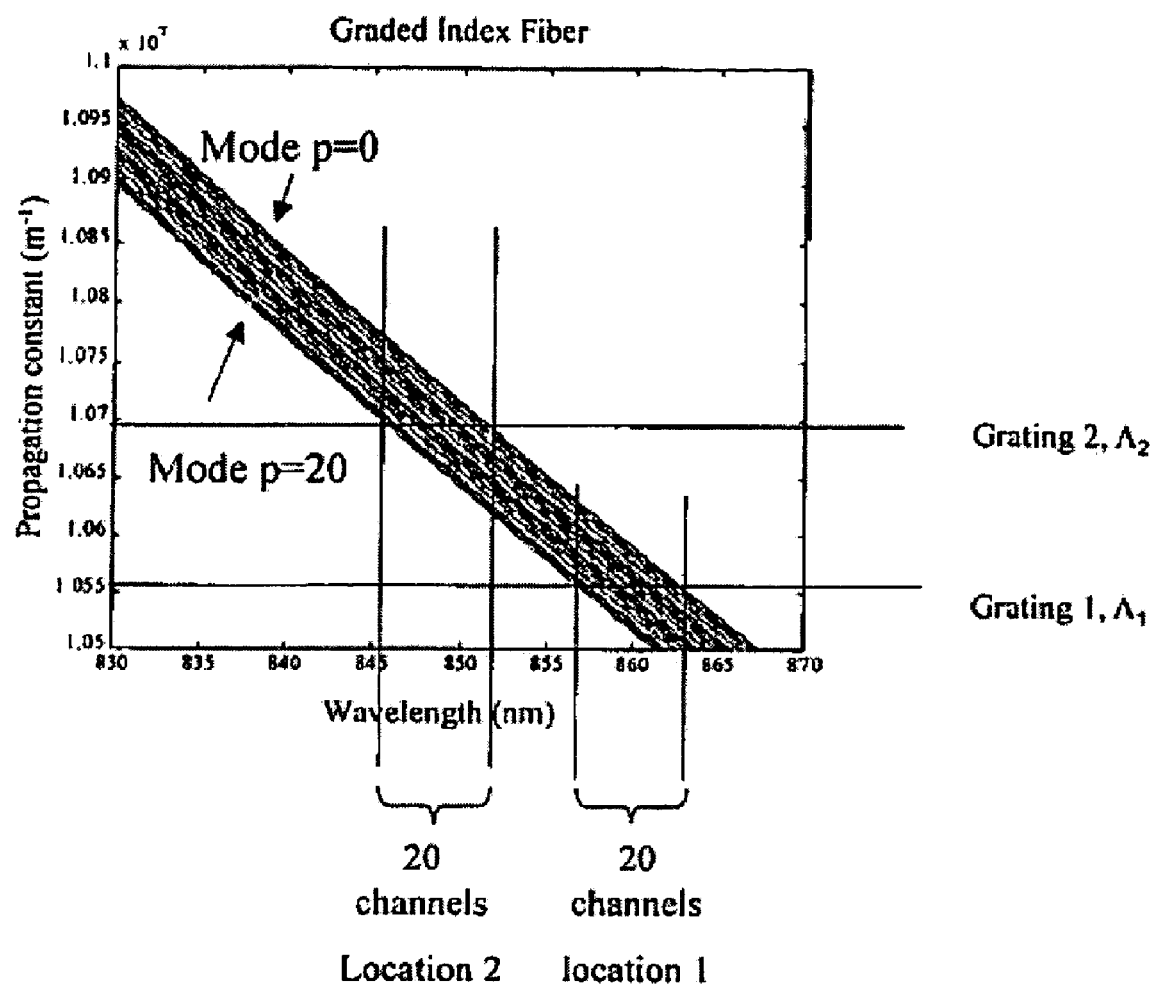
FIG. 3 depicts the interaction between two fiber bragg gratings and light at various wavelengths in a twenty mode fiber according to an embodiment of the present invention.

FIG. 3 depicts the interaction between two fiber bragg gratings and light at various wavelengths in a multimode fiber with a twenty principal modes according to an embodiment of the present invention. Referring to FIG. 3, it is apparent that twenty wavelengths or channels are extracted from the fiber at each location along the fiber 103. At each grating, the frequencies are different and determined by the grating.

The interaction between the grating and the light propagating in the fiber can be described by the Bragg condition:

$$\beta_1 - \beta_2 = \frac{2\pi}{\Lambda} \quad (1)$$

where $\beta_1$ and $\beta_2$ are the propagation constants of the forward and backward propagating modes, respectively, and $\Lambda$ is the grating period. For simplicity, the forward and backward waves may be assumed to have the same mode, i.e. $\beta_1 = -\beta_2 = \beta$ and the Bragg condition becomes:

$$\beta = \frac{\pi}{\Lambda} \quad (2)$$

In a multimode graded index fiber, the propagation constant of the principal mode P is given by:

$$\beta = \frac{2\pi}{\lambda} n_1 \sqrt{1 - 4\Delta \frac{P+1}{V}} \quad (3)$$

where $$V = \frac{\pi}{\lambda} dNA \text{ and } \Delta = \frac{n_1 - n_2}{n_1},$$

NA is the fiber numerical aperture, d the fiber core diameter and $n_1$ and $n_2$ are the refractive index of the core and clad, respectively. $\lambda$ is the wavelength of the incident light.

Substituting equation (3) into equation (2), we see that for each principal mode number P, we can find a wavelength $\lambda$ for which the Bragg condition is satisfied. Thus, a single Fiber Bragg Grating in a multimode graded index fiber interacts with a discrete number of wavelengths corresponding to the number of principal modes.

FIG. 2 shows a plot of equation (3) as a function of wavelength and principal mode number. Furthermore, each principal mode propagates in the fiber at a slightly different angle. This property is of interest when using a tilted Fiber Bragg Grating. In this case, the tilted FBG is an efficient wavelength demultiplexer as each reflected wavelength, associated with a unique principal mode, will come out of the fiber at a different angle.

Similarly, we can show that the above description is still valid for a multimode step index fiber. In this case, the propagation constant of the principal mode P is defined by:

$$\beta = \sqrt{\left(\frac{2\pi}{\lambda} n_1\right)^2 - \left(\frac{P\pi}{d}\right)^2} \quad (4)$$

The main difference between step index and graded index fiber interaction is the spacing between each reflected wavelength. In a graded index fiber, the spacing is nearly uniform while in a step index fiber, the spacing increases with increasing mode number.

Figure 4:
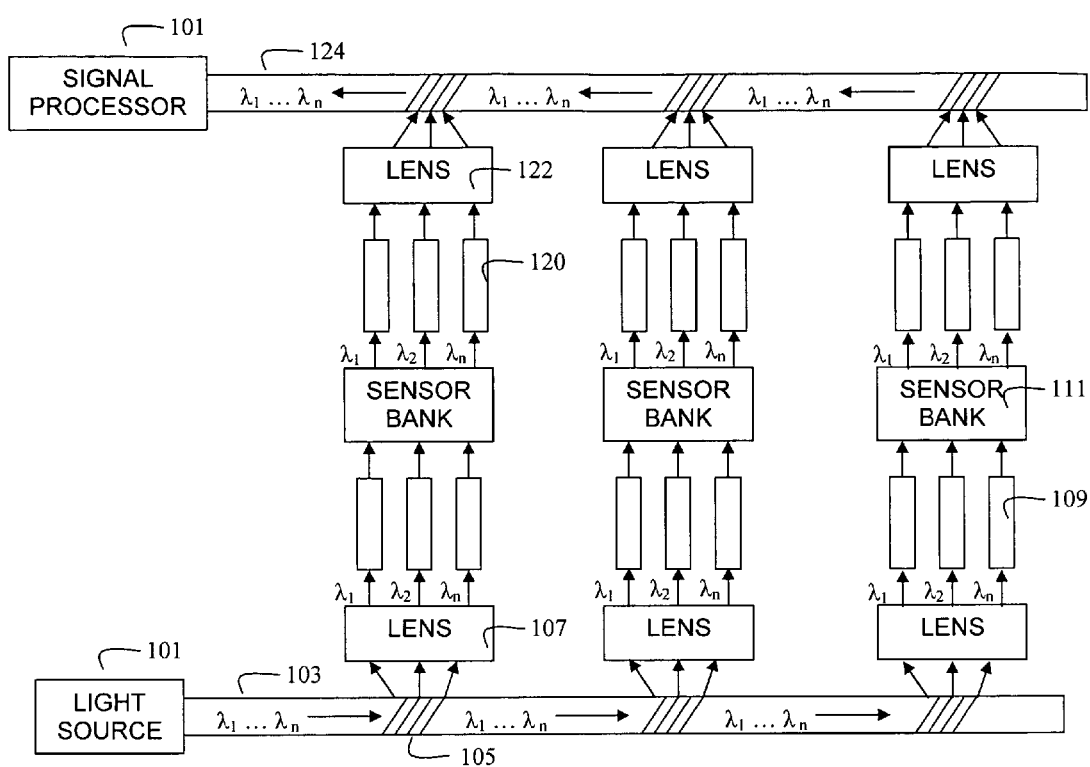
FIG. 4 depicts an optical network for distributing light over a multimode fiber to a plurality of sensors using fiber bragg gratings including a return path through a multimode fiber according to an embodiment of the present invention.

FIG. 4 depicts an optical network for distributing light over a multimode fiber to a plurality of sensors using fiber bragg gratings including a return path through a multimode fiber according to an embodiment of the present invention. Referring to FIG. 4, the optical network of FIG. 1 is expanded to show an implementation of an optical return path according to an embodiment of the present invention. Referring to FIG. 4, light at each desired wavelength reaches each optical sensor which imparts optical information onto the incident light. This sensor output is conveyed over a plurality of optical fibers 120, through a lens 122 back into a multimode optical fiber 124 through a plurality of FBGs. The FBG's coupled the light at particular frequencies back into the multimode fiber 124 and covey them along the multimode fiber toward a signal processor 101. The reverse path operates in the reverse manner as the forward path but according to the same principles.

The signal processor 101 may be used to receive light from the sensor network and determine the values output by the sensors. The signal processor 101 includes an optical detector. In the embodiment shown in FIG. 4, the light source may be a switched light source that interrogates the optical sensors by sending pulses of light. The signal processor in turn reads the sensor values by receiving the light at each wavelength in a time staggered manner from each sensor bank. The process of interrogating and reading an optical sensor is well known.

Illustrative sensors which may be implemented a system such as that depicted in FIG. 4 include any fiber optic sensor that is operative to output a value based on incoming light. This may occur, for example, by the sensor altering the wavelength or the intensity of the incoming light in some relationship according to the value.

Figure 5:
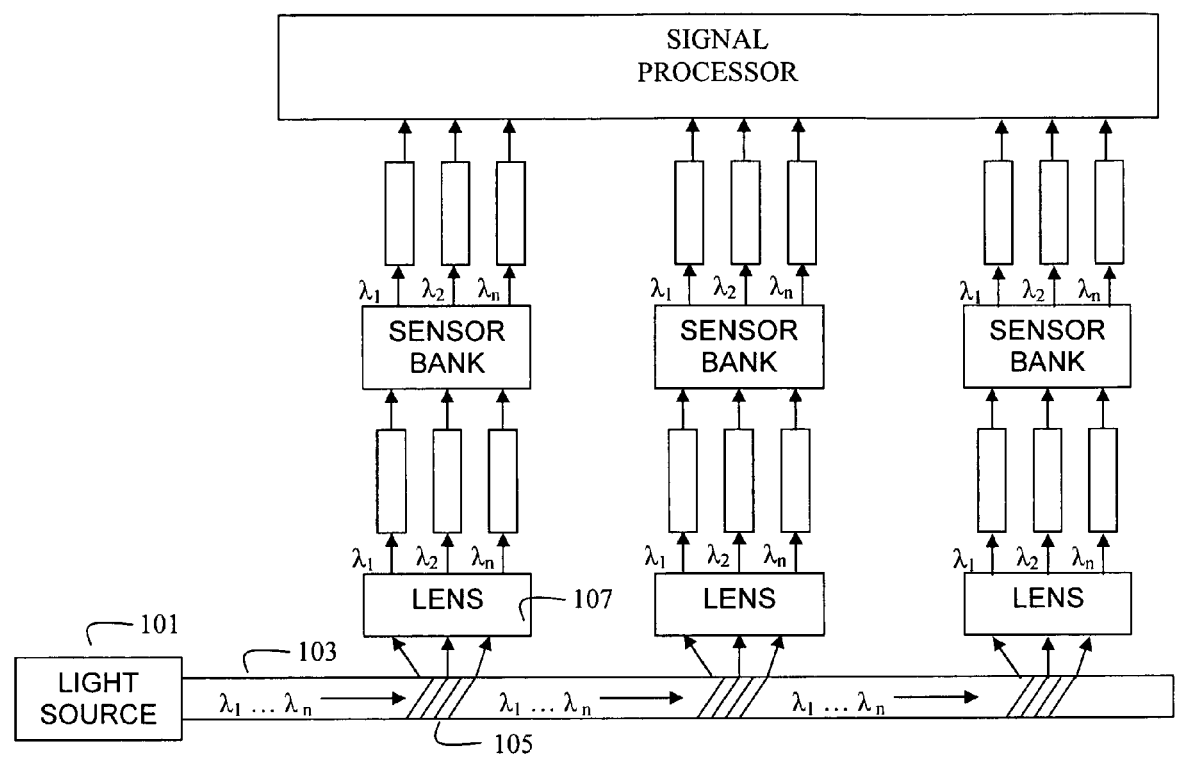
FIG. 5 depicts an optical network for distributing light over a multimode fiber to a plurality of sensors using fiber bragg gratings including multiple return paths according to an embodiment of the present invention.

FIG. 5 depicts an alternative embodiment of a return path for a sensor network according to an embodiment of the invention. Referring to FIG. 5, rather than implementing a single multimode fiber for the return path, multiple optical fibers are used to send the signal from the sensors back to a signal processor. The signal processor is then used to determine the values output by each sensor in the network.

An exemplary working system may be implemented according to the parameters of FIG. 2, which represents a graded index fiber with 50 um core diameter, index of refraction of 1.45 and a numerical aperture of 0.12. To induce reflections at wavelengths around 850 nm as shown, the grating period $\lambda_1$ is set to 294 nm. The same principles applies to any fiber size or numerical aperture.

FIG. 6 depicts an optical network for distributing light over a multimode fiber to a plurality of sensors using different FBGs which reflect different wavelengths at each location to respective sensors and a return path according to an embodiment of the present invention. Referring to FIG. 6, each FBG is shown as reflecting different wavelengths of light out of the fiber to a sensor network. Using this architecture, the detection of each sensor is easier as compared to the architecture of FIG. 5 because each sensor operates at a unique wavelength.

Figure 7:
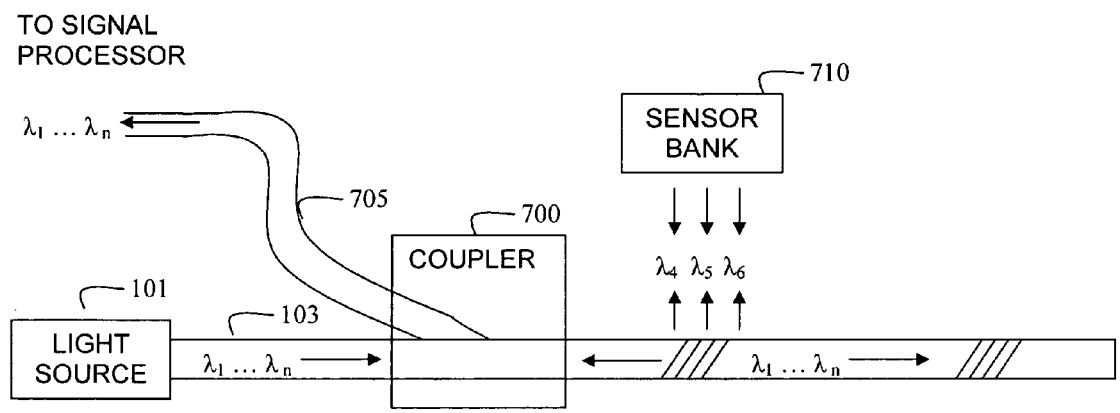
FIG. 7 depicts an optical distribution network according to an embodiment of the present invention in which the same fiber is used for downstream and upstream transmission of light to and from the sensor array.

FIG. 7 depicts yet another architecture according to an embodiment of the present invention. Referring to FIG. 7, a sensor distribution architecture is shown in which the sensor arrays 710 receive multiple wavelengths of light through a FBG from a multimode fiber 102 and, in turn, reflect light at those wavelengths back into the multimode fiber 102 at the FBG. The FBG in turn reflects the light received from the sensor array 710 back upstream toward the coupler 700. The coupler 700 passes downstream light from the light source 101 toward the FBGs and in the upstream direction passes upstream light from the FBGs to the upstream fiber 705. The upstream fiber 705 carries the reflected light from the sensor array 710 back toward a signal processor. The advantage of this configuration is that the same fiber 102 is used for both the forward and return paths. The coupler 700 may be positioned close to the light source to maximize the use of the same fiber 102 for downstream and upstream light transmission.

While particular embodiments of the present invention have been described, it will be understood that changes may be made to those embodiments without departing from the spirit and scope of the present invention. For example, it will be understood that any optics may be used to couple light reflected from each FBG to a desired sensor or other path or destination according to an embodiment of the present invention. Similarly, no optics may be used for the coupling. The same holds true for coupling a sensor to the return path, which may be implement with optics, such as an optical fiber or a lens, or no optics. Additionally, in some embodiments, one or more sensors may be built integrally onto the fiber such that no additional optics are needed to carry reflected light from the fiber to the sensors.

What is claimed is:

1. An apparatus for multiplexing light distributed along multimode fibers, comprising:
    a multimode fiber optical cable for carrying light from a light source; and
    a plurality of fiber bragg gratings along the multimode fiber optic cable that are offset from the fiber axis by a predetermined angle to reflect light so that the reflected light is not guided by the fiber;

wherein the reflected light reflected by each fiber bragg grating includes light at a particular wavelength for each mode of the multimode fiber optic cable, and wherein the reflected light is distributed from each of the fiber bragg gratings to a plurality of optical sensors.

2. The apparatus according to claim 1, wherein the light source is a broad band light source.

3. The apparatus according to claim 1, wherein each grating has a substantially constant periodicity.

4. The apparatus according to claim 1, wherein the reflected light corresponding to the particular wavelength for each mode leaves the multimode fiber optic cable through the fiber optic cladding at a different angle.

5. The apparatus according to claim 4, further comprising:
a plurality of fibers positioned to convey the reflected light from the fiber bragg gratings to the plurality of optical sensors.

6. The apparatus according to claim 5, wherein each of the plurality of fibers is positioned to convey reflected light corresponding to one particular wavelength to at least one of the optical sensors.

7. The apparatus according to claim 6, further comprising:
a lens positioned to convey the reflected light from each fiber bragg grating to corresponding ones of the plurality of fibers.

8. The apparatus according to claim 5, wherein each of the plurality of fiber bragg gratings has substantially the same periodicity.

9. The apparatus according to claim 8, wherein the plurality of optical sensors comprise:
a bank of optical sensors corresponding to each fiber bragg grating;
wherein each sensor in each bank corresponds to a particular wavelength of reflected light from the corresponding fiber bragg grating.

10. The apparatus according to claim 8, wherein the plurality of optical sensors comprise:
a bank of optical sensors corresponding to each fiber bragg grating;
wherein each sensor in each bank corresponds to a plurality wavelengths of reflected light from the corresponding fiber bragg grating.

11. The apparatus according to claim 8, wherein the plurality of optical sensors comprise:
a bank of optical sensors corresponding to each fiber bragg grating;
wherein each sensor in each bank corresponds to a continuous range of wavelengths of reflected light from the corresponding fiber bragg grating.

12. The apparatus according to claim 1, wherein at least some of the plurality of fiber bragg gratings has a different periodicity than others of the plurality of fiber bragg gratings.

13. The apparatus according to claim 1, wherein the angle of the grating is chosen based on a desired strength of the grating.

14. The apparatus according to claim 1, wherein the angle of the grating is chosen to produce reflected, polarized light.

15. The apparatus according to claim 1, further comprising:
a plurality of return optical fibers that convey the reflected light from the plurality of optical sensors to a signal processor.

16. The apparatus according to claim 1, further comprising:

a multimode fiber optic return cable for carrying reflected light from the light source and the optical sensors; and
a plurality of return fiber bragg gratings along the multimode fiber optic return cable that are offset from the fiber axis by a predetermined angle to reflect light so that the reflected light is coupled into the multimode fiber optic return cable and guided by the fiber;
wherein the reflected light is returned from each of the return fiber bragg gratings to a signal processor.

17. The apparatus according to claim 16, wherein the reflected light is coupled between the each optical sensor and the multimode fiber optic return cable through a corresponding return optical fiber.

18. The apparatus according to claim 17, a return lens positioned to convey the reflected light from each return optical fiber to a corresponding one of the return fiber bragg gratings.

19. The apparatus according to claim 16, wherein the optical sensors comprise:
a bank of optical sensors corresponding to each fiber bragg grating;
wherein each sensor in each bank corresponds to a particular wavelength of reflected light from the corresponding fiber bragg grating.

20. The apparatus according to claim 1, further comprising at least one mode scrambler positioned between at least some of the plurality of fiber bragg gratings.

21. The apparatus according to claim 1, wherein the multimode fiber optical cable is a step index fiber.

22. The apparatus according to claim 1, wherein the multimode fiber optical cable is a graded index fiber.

23. The apparatus according to claim 1, wherein at least some of the plurality of fiber bragg gratings reflect the same wavelengths and the same mode of light within the multimode optical fiber.

24. The apparatus according to claim 1, wherein at least some of the plurality of fiber bragg gratings reflect the same wavelengths of light using different modes of light within the multimode optical fiber.

25. The apparatus according to claim 1, wherein at least one of the plurality of fiber bragg gratings reflects different wavelengths of light than other ones of the plurality of fiber bragg gratings.

26. The apparatus according to claim 25, wherein the plurality of fiber bragg gratings reflect wavelengths of light in a first range and wherein at least some of the different wavelengths of light are within the first range.

27. The apparatus according to claim 25, wherein the plurality of fiber bragg gratings reflect wavelengths of light in a first range and wherein all of the different wavelengths of light are outside of the first range.

28. A method of distributing light to a plurality of sensors along multimode fibers, comprising:
carrying light from a light source along a multimode fiber optical cable; and
reflecting light from a plurality of fiber bragg gratings along the multimode fiber optic cable so that the reflected light is not guided by the fiber; and
distributing the reflected light from each of the fiber bragg gratings to a plurality of optical sensors;
wherein the reflected light reflected by each fiber bragg grating includes light at a particular wavelength for each mode of the multimode fiber optic cable.

* * * * *